No. 736,909. Patented August 18, 1903.

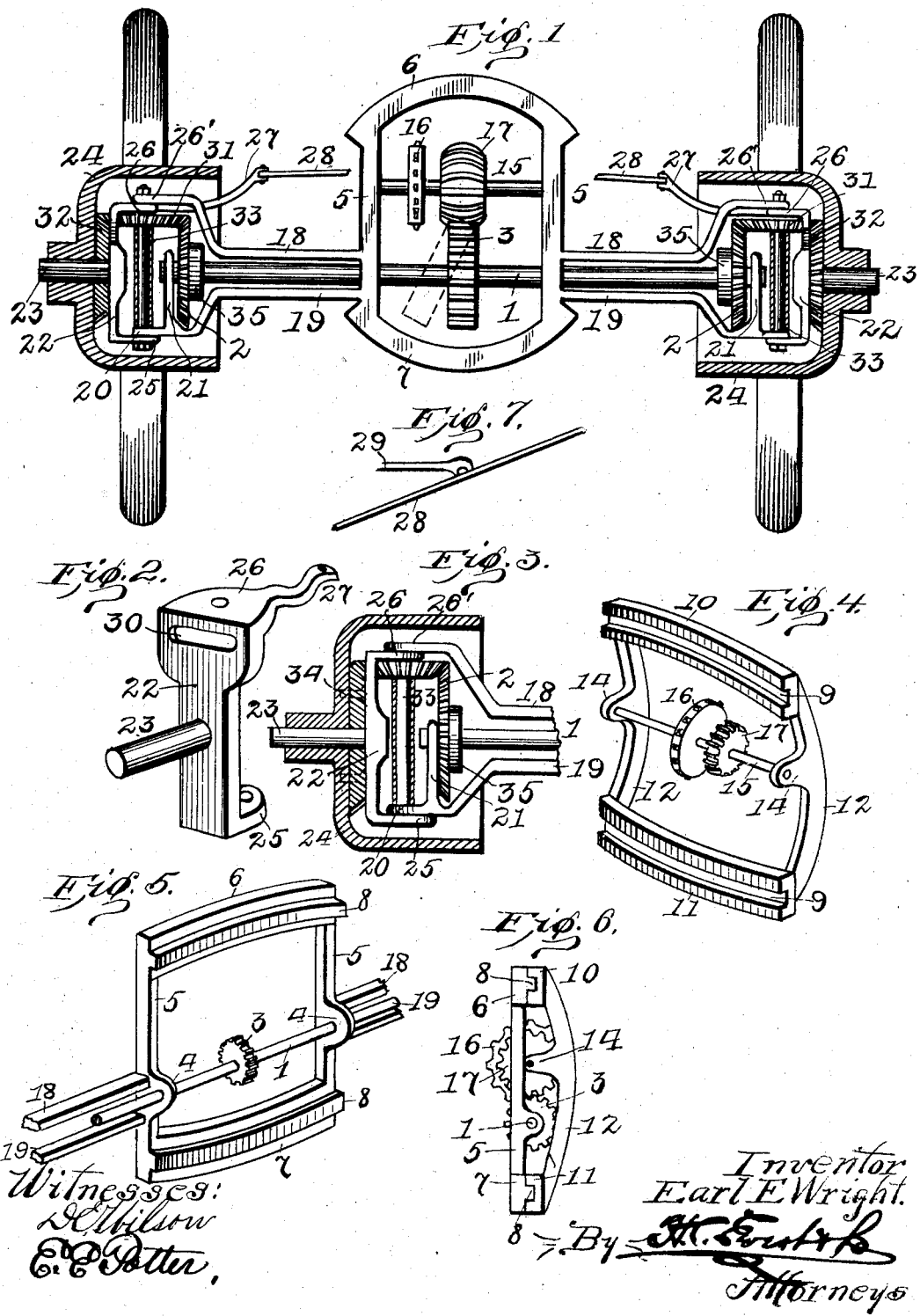

UNITED STATES PATENT OFFICE.

EARL E. WRIGHT, OF NEW BRIGHTON, PENNSYLVANIA.

DRIVING-GEAR FOR MOTOR-VEHICLES.

SPECIFICATION forming part of Letters Patent No. 736,909, dated August 18, 1903.

Application filed December 5, 1902. Serial No. 134,000. (No model.)

*To all whom it may concern:*

Be it known that I, EARL E. WRIGHT, a citizen of the United States of America, residing at New Brighton, in the county of Beaver and State of Pennsylvania, have invented certain new and useful Improvements in Driving-Gear for Motor-Vehicles, of which the following is a specification, reference being had therein to the accompanying drawings.

This invention relates to certain new and useful improvements in driving-gears for motor-vehicles; and it has for its object to provide a novel form of driving-gear which will permit of a positive driving being effected, irrespective as to whether the wheels are upon the same level, and also to obtain a positive driving when the front wheels of the vehicle are at an angle with respect to the rear wheels of such vehicle.

My invention further resides in the novel construction whereby the gear mechanism is inclosed and largely protected from dust and dirt.

The invention further resides in the novel construction, combination, and arrangement of parts to be hereinafter more fully described, and specifically pointed out in the claims.

In describing the invention in detail reference is had to the accompanying drawings, forming a part of this specification, and wherein like numerals of reference indicate like parts throughout the several views, in which—

Figure 1 is a central vertical sectional view showing the front or drive axle of the vehicle embodying my improvements, the rear wheels being shown in elevation. Fig. 2 is a detail perspective view of the wheel-supporting bracket. Fig. 3 is a central vertical sectional view of the hub, showing the gear of one wheel and a modified form of attaching the gear carried by the hub. Fig. 4 is a detail perspective view of the section or member of the frame which is adapted to be attached to the vehicle-body. Fig. 5 is a like view of the section or member of the frame carried by the front axle, and Fig. 6 is an end elevation of the frame.

In the accompanying drawings, 1 indicates the front axle or shaft of the vehicle, on which is mounted near each end a driving beveled gear-wheel 2. This axle or shaft 1 carries a central drive or gear wheel 3, and it rotates freely in lugs or ears 4, carried by the upright bars 5 of the front section or member of the rock-frame, the top bar 6 and lower bar 7 of this frame being provided with tongues 8, which engage in grooves 9, provided therefor in the top bar 10 and lower cross-bar 11 of the rear section or member of the rock-frame. The tongues 8 and grooves 9 are curved in the arc of a circle, the rear member or section of the frame being rigid and the front or outer section or member adapted to rock in relation thereto. The cross-bars 10 11 are connected together by bowed uprights 12, which are adapted to be suitably connected to the body (not shown) of the vehicle, the uprights being provided with lugs 14, in which is journaled a shaft 15, having mounted thereon a sprocket-wheel 16 and driving pinion or gear 17. Both of these driving pinions or gears 17 are formed on the arc of a circle, whereby when the axle is at a tangent and one of the wheels of the front axle is elevated above the plane of the other wheel the pinion or drive-gear 17 will still be in full mesh with the gear 3, as is indicated by dotted lines in Fig. 1 of the drawings.

Connected to the upright 5 of the rock member of the frame, above and below the axle 1, are supporting bracket-arms 18 19, respectivley. The bracket-arms 19 terminate in bearings 20 and adjacent to said bearings 20 carry upwardly-extending brackets 21, which form bearings for the ends of the axle 1. The wheel-supporting bracket 22 carries a spindle 23, the latter extending into the journal formed therefor in the encircling hub 24. The wheel-supporting bracket 22 at its lower end is provided with a bearing 25 and at its upper end with a bearing 26 and also an extension or arm 27, to which the cross-rod 28 is connected, and to said cross-rod 28 the steering-lever 29 is suitably attached. The wheel-supporting bracket 22 is also provided with a clearance-opening 30 to permit the meshing of beveled pinions 31 with the beveled gear or pinion 32, carried by the hub 24 and rigid therewith. The beveled pinion 31 is driven by the beveled pinion 32, said pinion 31 being mounted on a spindle or shaft 33, which passes through bearings 20, 25, 26, and 26', the latter formed at the end of the bracket-arms 18. In construction the beveled pinions 32 may be cast integral with the inner face of the hub 24, or these pinions may be rigidly fastened thereto by means of bolts or screws 34, as shown in Fig. 3 of the drawings. The spokes of the wheel are adapted to be suitably attached to the periphery of the circular hub 24 in any desired manner. I have shown in the present illustration spring-clutches 35, which are of the ordinary form of construction and are for the purpose well known in the art and are therefore not shown in detail in this application. These clutches may be employed in the location in which I have shown them, or the central axle 1 could be divided at the center and a clutch employed at each side of the drive-gear 3.

By the arrangement of the tongued or grooved cross-bars 6 10 and 7 11 it will be observed that the front section or member of the frame embodying the cross-bars 6 7 will assume an angle with respect to the stationary section or member of the frame embodying the bars 10 11 when the wheels are placed upon different planes, permitting the body of the vehicle to be maintained on a substantially horizontal plane at all times. The hub 24, inclosing the driving beveled pinions, protects the same from dust and dirt, and it is to be noted that the hub may be constructed with a pinion 32 integral therewith or rigidly secured thereto in any desired manner, as seen in Fig. 3 of the drawings.

While I have herein shown and described my invention in detail, it will be observed that in the practice of the same various changes may be made, such as will clearly come within the scope of the appended claims.

Having fully described my invention, what I claim as new, and desire to secure by Letters Patent, is—

1. In driving mechanism for motor-vehicles, the combination with a main frame having a rocking member and a stationary member, said member having matching tongues and grooves, an axle or drive shaft journaled in the rocking member of the frame and provided with beveled wheels at each end, a shaft having mounted thereon a sprocket-wheel and driving-pinion journaled in said stationary member, traction-wheel-supporting brackets mounted in the outer ends of the frame, hubs mounted on said brackets, beveled pinions carried by said hubs, spindles or shafts connecting the framework with the wheel-supporting brackets, pinions mounted on the said spindles or shafts, and meshing with the pinions carried by the hub and the pinions carried by the shaft, and means for transmitting motion to the axle or shaft, substantially as described.

2. In driving mechanism for motor-vehicles, the combination of a main framework embodying a stationary member and a rocking member having matching tongues and grooves, an axle or main shaft journaled in the stationary member and provided with beveled wheels at each end, bars outside the driving-bevels, wheel-supporting brackets, shafts or spindles connecting the wheel-supporting brackets and the main framework and provided with clearance-openings, hubs surrounding said wheel-supporting brackets, bevels carried by said hub, and beveled pinions meshing with the bevels of the hub and the bevels on the axle or main shaft, substantially as described.

3. In driving mechanism for motor-vehicles, the combination of a main framework embodying a stationary member and a rocking member having matching tongues and grooves, an axle or main shaft journaled in the rocking member and provided with beveled wheels at each end, the said rocking member carrying a shaft, a sprocket and driving-gear mounted on the said last-named shaft, bars outside the driving-bevels, wheel-supporting brackets, shafts or spindles connecting the wheel-supporting brackets and the main framework and provided with clearance-openings, hubs surrounding said wheel-supporting brackets, bevels carried by said hub and beveled pinions meshing with the bevels of the hub and the bevels on the axle or main shaft, substantially as described.

In testimony whereof I affix my signature in the presence of two witnesses.

EARL E. WRIGHT.

Witnesses:
A. M. WILSON,
H. C. EVERT.